US00RE48203E

(19) United States
(12) Reissued Patent
McCauley

(10) Patent Number: US RE48,203 E
(45) Date of Reissued Patent: Sep. 15, 2020

(54) LAYOUT BLIND WITH ADJUSTABLE LEG SUPPORT AND FOLDABLE FLAP SUPPORT

(71) Applicant: Higdon Outdoors, LLC, Paducah, KY (US)

(72) Inventor: Ira D. McCauley, Defiance, MO (US)

(73) Assignee: Higdon Outdoors, LLC, Paducah, KY (US)

(21) Appl. No.: 16/229,510

(22) Filed: Dec. 21, 2018

Related U.S. Patent Documents

Reissue of:
(64) Patent No.: 9,717,233
Issued: Aug. 1, 2017
Appl. No.: 15/211,629
Filed: Jul. 15, 2016

U.S. Applications:
(60) Provisional application No. 62/193,940, filed on Jul. 17, 2015.

(51) Int. Cl.

| | |
|---|---|
| ***A01M 31/00*** | (2006.01) |
| ***E04H 15/00*** | (2006.01) |
| ***A47C 17/70*** | (2006.01) |
| ***A01M 31/02*** | (2006.01) |
| *E04H 15/48* | (2006.01) |

(52) U.S. Cl.
CPC ..... *A01M 31/025* (2013.01); *A47C 17/70* (2013.01); *E04H 15/001* (2013.01)

(58) Field of Classification Search
CPC ..... A47C 11/10; E04H 15/001
USPC ..... 135/143, 144, 146, 151, 191; 5/113, 415
See application file for complete search history.

(56) References Cited

U.S. PATENT DOCUMENTS

| | | | | |
|---|---|---|---|---|
| 37,094 | A * | 12/1862 | Gardner | A47C 17/64 135/144 |
| 2,511,452 | A | 6/1950 | Anderson et al. | |
| 2,690,186 | A | 9/1954 | Ball | |
| 3,278,953 | A | 10/1966 | Willis | |
| 3,584,322 | A | 6/1971 | McDougall | |
| 3,601,825 | A | 8/1971 | Moorhead et al. | |
| 3,822,422 | A | 7/1974 | Buntyn | |
| 3,848,279 | A | 11/1974 | Ipsen | |
| 3,933,164 | A | 1/1976 | Ness et al. | |
| 3,947,903 | A * | 4/1976 | Menke | A47C 1/14 190/2 |
| 3,956,781 | A | 5/1976 | Reemelin | |
| 4,086,674 | A * | 5/1978 | Chiaradonna | A47C 7/66 135/115 |
| 4,671,203 | A | 6/1987 | Sanburg | |
| 4,914,768 | A * | 4/1990 | Howard | A47C 29/006 5/113 |
| 5,018,227 | A * | 5/1991 | Canfield | A47C 29/003 5/111 |
| 5,210,888 | A | 5/1993 | Canfield | |

(Continued)

*Primary Examiner* — Cary E Wehner
(74) *Attorney, Agent, or Firm* — C. Brandon Browning; Maynard, Cooper & Gale, PC

(57) ABSTRACT

A layout blind for use in a marshy environment or in a dry field with a support frame and a fabric cover. The frame is supported on extendible legs and has three foldable sections. A U-shaped head frame and a U-shaped foot frame are pivoted to the support frame. First and second U-shaped flap support frames are pivoted between the head frame and the foot frame and are foldable about a pivot hinge with a stop.

27 Claims, 7 Drawing Sheets

(56) References Cited

U.S. PATENT DOCUMENTS 5,449,014 A * 9/1995 Yan-ho ..... A47C 29/003 135/156
5,489,052 A 2/1996 Blood
D405,890 S 2/1999 Latschaw
6,151,730 A 11/2000 Weston
6,375,200 B1 4/2002 Harter
6,698,131 B2 3/2004 Latschaw
6,769,379 B2 8/2004 Folles
7,063,035 B2 6/2006 Belcher
D572,371 S 7/2008 Desouche et al.
7,549,434 B2 6/2009 Bean
7,997,291 B2 8/2011 Gressette, III et al.
8,042,865 B2 10/2011 Fargason, III
8,381,749 B1 * 2/2013 Ashmore, Jr. ..... E04H 15/001 135/90
8,381,750 B2 2/2013 Desouche et al.
8,585,135 B2 11/2013 Wilson
8,656,855 B2 2/2014 Flood
D712,994 S 9/2014 Larson
8,936,036 B2 * 1/2015 Parsons ..... E04H 15/58 135/117
D734,492 S 7/2015 Galloway
9,072,290 B1 7/2015 McCauley
9,133,644 B1 * 9/2015 Liu ..... E04H 15/001
D750,273 S 2/2016 Kasprowicz
9,259,094 B1 2/2016 McCauley
9,279,268 B2 * 3/2016 Liu ..... E04H 15/48
9,303,424 B1 * 4/2016 Galloway ..... E04H 15/001
9,303,425 B1 * 4/2016 Galloway ..... A01M 31/025
9,426,978 B1 8/2016 Galloway
9,428,930 B2 * 8/2016 Liu ..... A01M 31/025
9,717,233 B1 8/2017 McCauley
2002/0124310 A1 9/2002 Takeuchi
2004/0231221 A1 * 11/2004 Latschaw ..... A01M 31/025 43/1
2006/0266399 A1 11/2006 Ferrari
2006/0284457 A1 12/2006 Holley
2007/0221261 A1 * 9/2007 Bean ..... E04H 15/001 135/143
2008/0202573 A1 4/2008 Corbiere
2009/0039685 A1 2/2009 Zernov
2013/0146113 A1 6/2013 Hawk, III et al. .. A01M 31/025 135/143
2013/0291916 A1 11/2013 Parsons
2016/0040448 A1 * 2/2016 Liu ..... E04H 15/48 135/144
2016/0050907 A1 * 2/2016 Parsons ..... A01M 31/025 297/184.14
2016/0316923 A1 11/2016 Choi
2017/0196363 A1 7/2017 Ray

* cited by examiner

LAYOUT BLIND WITH ADJUSTABLE LEG SUPPORT AND FOLDABLE FLAP SUPPORT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*The present application is an application for reissue of U.S. Pat. No. 9,717,233 B1, issued Aug. 1, 2017 on U.S. Non-Provisional Patent Application No. 15/211,629, filed Jul. 15, 2016, and claims priority to and the benefit under 35 U.S.C. § 119(e) of the filing date of U.S. Provisional Patent Application No. 62/193,940, filed Jul. 17, 2015, entitled "Layout Blind Cot With Adjustable Leg Support." The content of the above-identified patent documents is hereby incorporated by reference into the present application as if fully set forth herein.*

BACKGROUND

This section provides background information related to the present disclosure which is not necessarily prior art.

1. Field of Technology

The present invention relates to a layout blind which can be used in a marshy environment or in a dry field. It combines the aquatic versatility of a layout boat with the portability and compact size of a layout blind.

2. Background of the Technology

Marshy wetlands are favored by waterfowl such as ducks and geese but the birds are also found upland in dry corn fields and the like at other times. Keeping a low, really low, profile improves a hunter's chance of shooting at surprised birds, for which purpose a hunter who hunts in both environments needs to have several different pieces of equipment. For use in shallow water on the edge of low weeds or out in flooded fields, a layout boat is useful but layout boats are expensive and cannot be collapsed for transportation and storage. For upland hunting there are layout blinds but they cannot be effectively used in a flooded field. What is needed is a versatile piece of the equipment that has the advantages of a layout boat but is good for upland hunting.

BRIEF SUMMARY OF VARIOUS PREFERRED EMBODIMENTS OF THE INVENTION

In view of the above, it is an object of the present invention to provide a versatile collapsible layout blind that can be used in a marshy environment as well as for upland hunting. Other objects and features of the invention will be in part apparent and in part pointed out hereinafter.

In accordance with the invention, a layout blind for use in a marshy environment or in a dry field is provided. The blind includes a support frame and a fabric cover. The support frame is generally rectangular and foldable in sections with an upper and lower side and a fabric support platform stretched tautly on the rectangular frame. A U-shaped head frame is pivoted to the upper side of the rectangular frame as is a U-shaped foot frame. First and second U-shaped flap support frames are pivoted between the head frame and the foot frame. The U-shaped flap support frames have first and second arms connected by a pivot hinge with a stop.

A plurality of extendible legs are pivoted to a lower side of the rectangular frame and the cover is configured to drape over the U-shaped head frame and the U-shaped foot frame in upright pivoted position. The fabric cover is split from the U-shaped head frame to the U-shaped foot frame with attached fabric flaps for covering the split. The cover is attached to the fabric support platform and the fabric flaps are attached to the U-shaped flap support frames to envelop and conceal a user inclined on the fabric support platform. In other embodiments, the layout blind is mounted on independently adjustable legs as described above with lily pad or web feet for stability to make for easy access in and out of the blind.

BRIEF DESCRIPTION OF THE SEVERAL VIEWS OF THE DRAWINGS

In the accompanying drawings in which several of various possible embodiments of the invention are illustrated, corresponding reference characters refer to corresponding parts throughout the several views of the drawings in which.

DETAILED DESCRIPTION OF AT LEAST ONE PREFERRED EMBODIMENT OF THE INVENTION

The following detailed description is merely exemplary in nature and is not intended to limit the described embodiments or the application and uses of the described embodiments.

Figure 1:
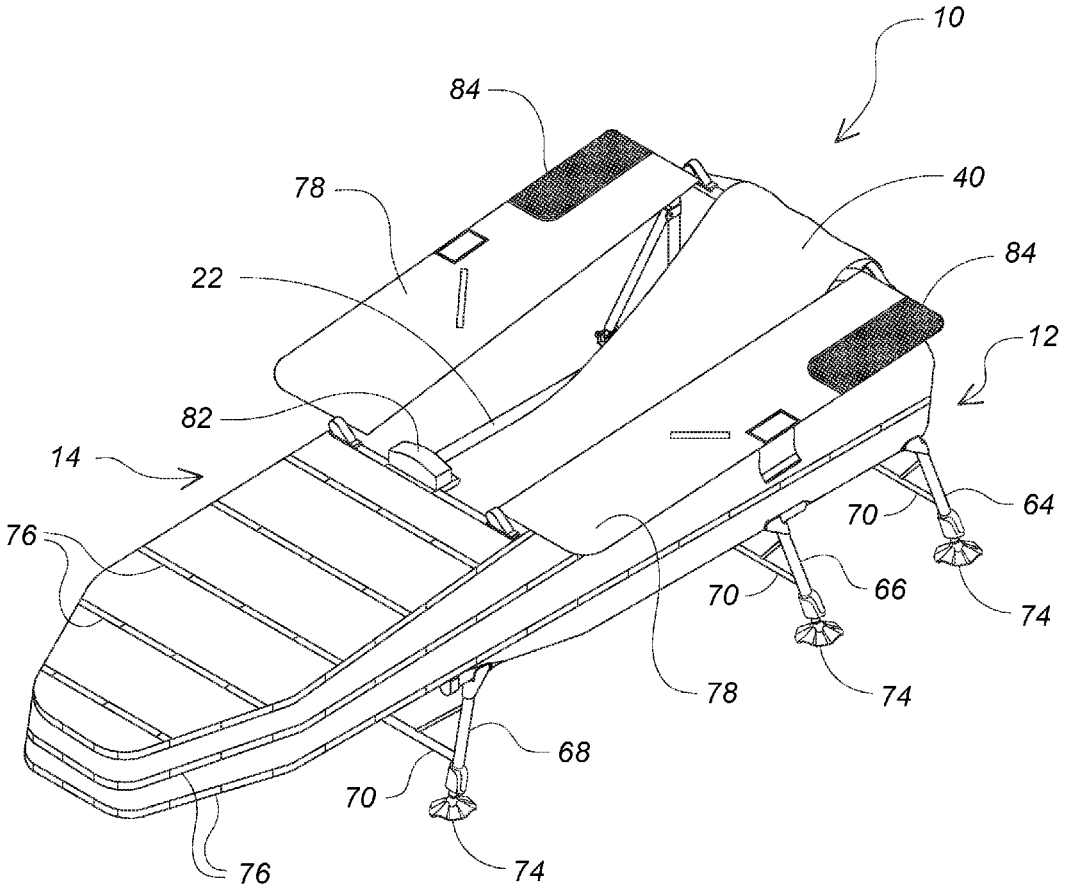
FIG. 1 is perspective view of a layout blind supported on a support frame with extendible legs.

Referring to the drawings more particularly by reference character, reference numeral 10 refers to a layout blind for use in a marshy environment or in a dry field. As shown in FIG. 1, layout blind 10 includes a support frame 12 to which is attached a cover 14. Frame 12 is shown in FIGS. 2-11 without support platform 22 and cover 14 for clarity.

Support Frame:

Support frame 12 includes a generally rectangular cot frame 16 having an upper and lower side 18, 20 (FIG. 3), respectively and a fabric support platform 22 stretched tautly on the cot frame 16. Cot frame 16 is foldable and formed in sections comprising a U-shaped head section 24 and a U-shaped foot section 26, said head section 24 and foot section 26 pivotally connected to a center section 28. Center section 28 is tapered towards foot section 26 such that when U-shaped foot section 26 is folded against center section 28, U-shaped foot section 26 nests inside the center section.

A U-shaped head frame is pivoted to upper side 18 of rectangular frame inboard of a head end 32 (FIG. 3) of cot frame 16. The U-shaped head frame 30 is selectively held in an upward position with respect to head section 24 with braces 34. Braces 34 connect a leg of U-shaped head section 24 and a leg of U-shaped head frame 30. Braces 34 are rotatably connected to head frame 30 and head section 24 with pivot brackets 36, 38. Preferably pivot bracket 36 at head frame 30 can be released with relative ease so that head frame 30 can be selectively collapsed against head section 24 of cot frame 16. In one embodiment, U-shaped head frame 30 has a dropped middle to accommodate a sling 40 as seen in FIG. 1.

Figure 12:
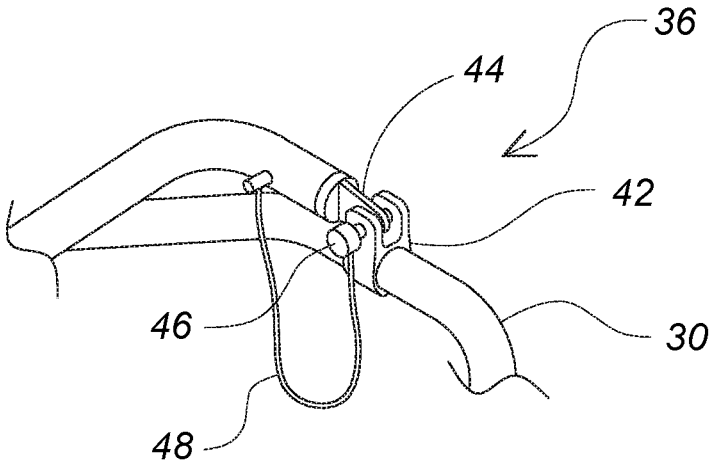
FIG. 12 is a perspective view a first pin-release pivot bracket.
Figure 13:
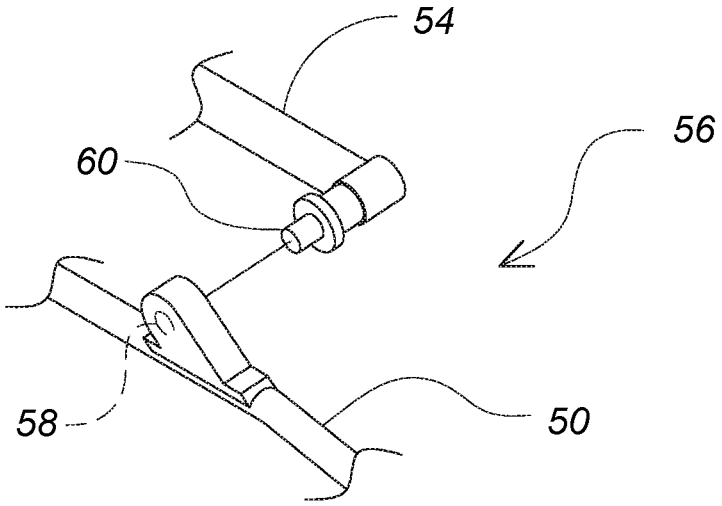
FIG. 13 is a perspective view of a second freely journaled pivot bracket assembly.

Pivot bracket 36 may be formed as shown in FIG. 12 wherein a clevis member 42 having pin holes through both ends thereof is clamped to the frame. A cooperating insert member 44 having a matching pin hole is inserted between the ends of clevis member 42 and a pivot pin 46 is inserted in the pin holes of clevis member 42 and insert member 44 so that brace 34 is rotatable in pivot bracket 36. A keeper 48 may be provided for pivot pin 46 such that it is kept in assembly with support frame 12.

A U-shaped foot frame 50 is pivoted to upper side 18 of center section 28 of cot frame 16. For this purpose a pivot bracket 52 may be like pivot bracket 38 used at the lower end of braces 34 or other some other configuration.

First and second U-shaped flap frames 54 are pivoted to head frame 30 and flank the dropped middle thereof. Opposite ends of flap frames 54 are pivoted to foot frame 50. A pivot bracket 36 as shown in FIG. 12 may be used for pivotable attachment to head frame 30 and a pivot bracket 56 as shown in FIG. 12 may be on foot frame 50. Pivot bracket 56 includes a recess 58 into which is inserted an end of flap frame 54. When pin 46 is released from clevis member 42, flap frame 54 is released from head frame 30. The opposite end of flap frame 54 may then be pulled out of pivot bracket 56.

Figure 2:
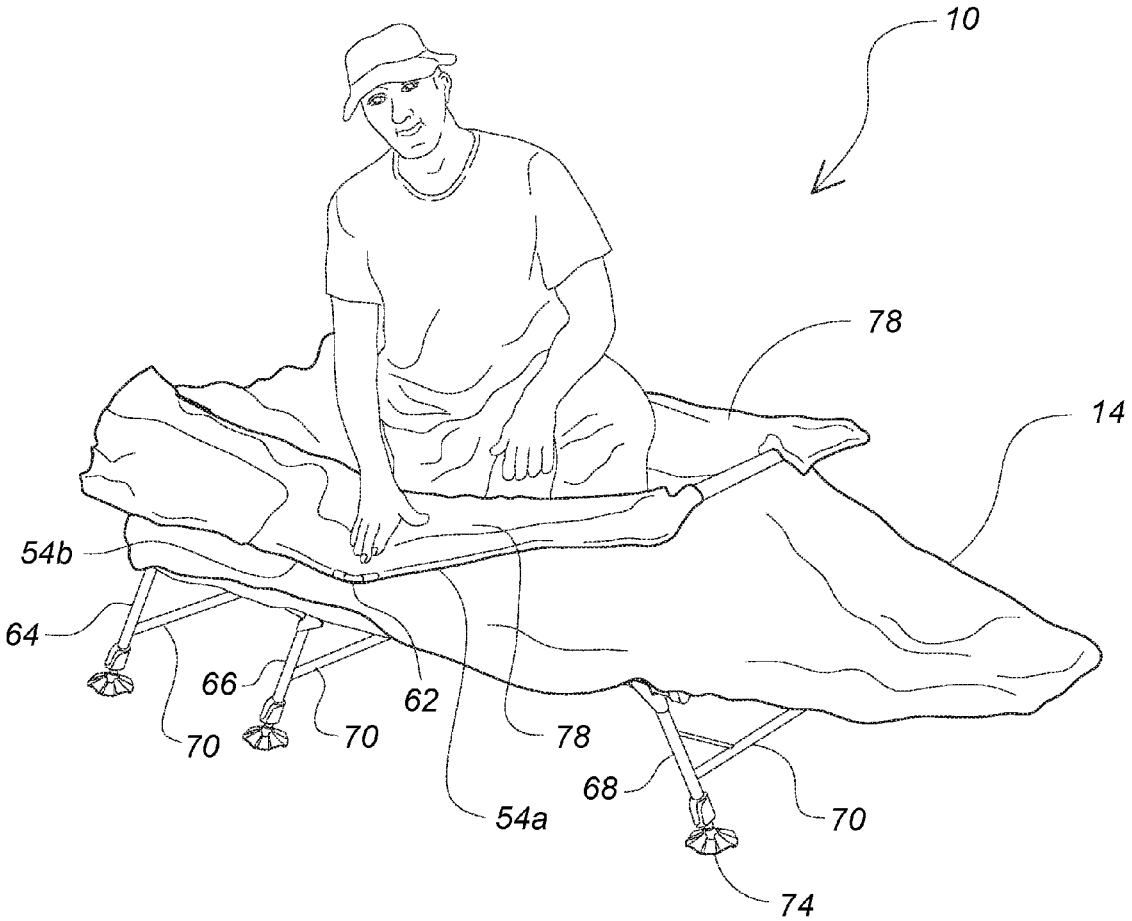
FIG. 2 is perspective view of the layout blind with a user demonstrating how the U-shaped flap support frames fold if accidentally leaned upon in getting in and out of the blind.
Figure 3:
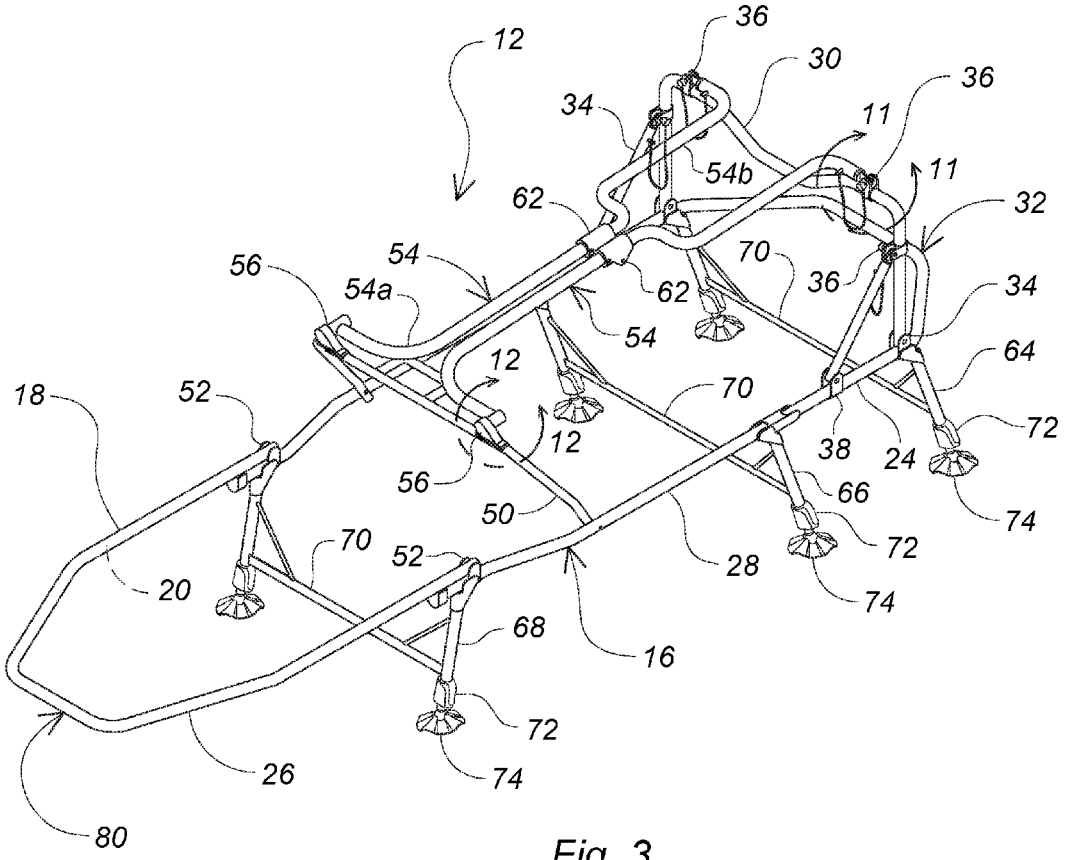
FIG. 3 is a perspective view of the support frame of the layout blind with the cover and support platform removed for clarity.
Figure 4:
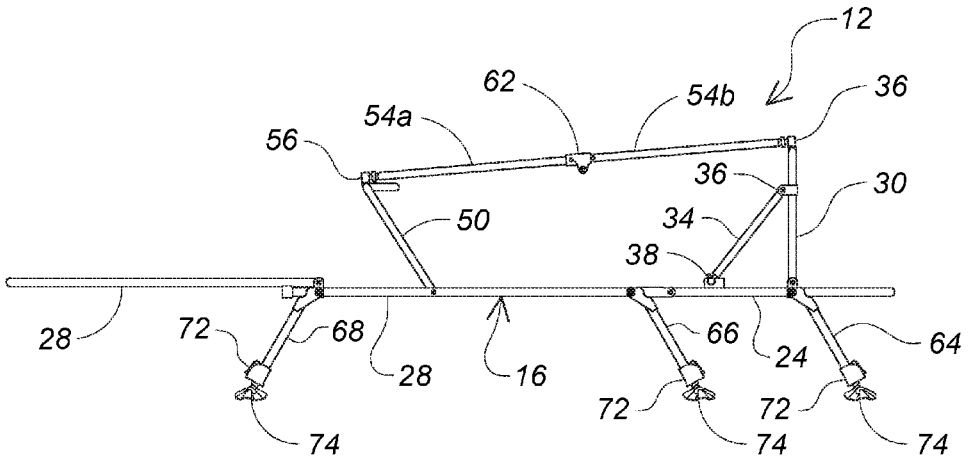
FIG. 4 is a side elevation of the support frame with the U-shaped flap frames folded down.

Flap frames 54 includes first and second arms 54a and 54b which are connected with a pivot hinge 62 with a stop. In the form illustrated, hinge 62 is a 180 degree pivot hinge but hinges holding arms 54a and 54b at lesser angles may be used. As pressure is applied to arms 54a and 54b by in a downward direction as viewed in FIG. 3, hinge 62 opens to its maximum amount but when pressure is applied on hinge 62 or legs 54a and 54b in an opposite direction hinge 62 folds which has two important functions. First, if an operator accidentally uses flap frames 54 for support in getting in and out of blind 10 as shown in FIG. 2, the end of flap frame 54 attached to U-shaped foot section 26 is pulled out of bracket 56 and flap frames 54 will start to fold. This is an important feature as the flap frames on other blinds bend instead of fold thereby possibly making the blind unusable.

Figure 6:
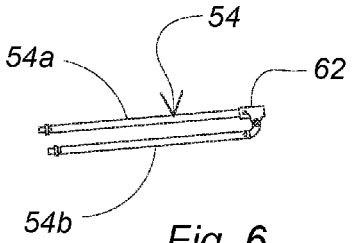
FIG. 6 is a side elevation of the U-shaped flap frame folded.
Figure 5:
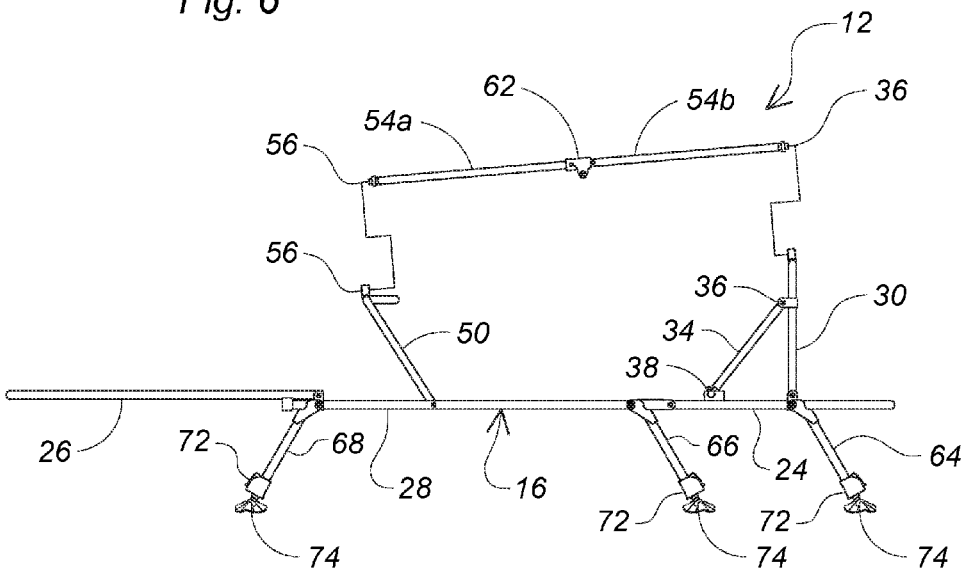
FIG. 5 is a side elevation of the support frame with the U-shaped flap frames detached from the head frame and from the foot frame.
Figure 7:
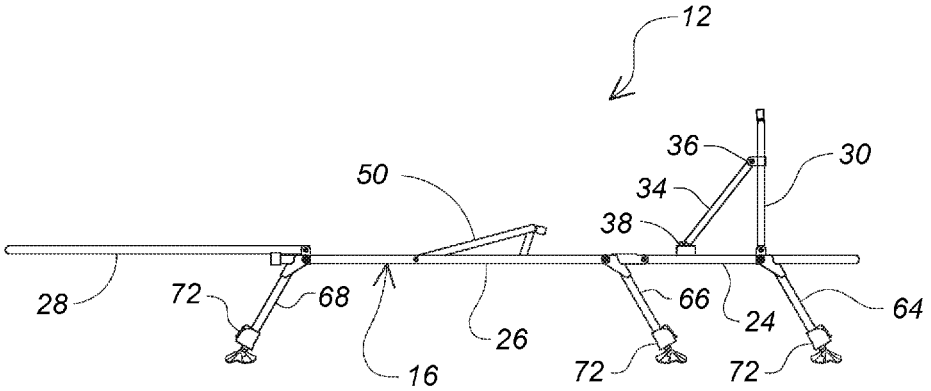
FIGS. 7-11 are a progression of side elevations showing the layout blind being folded for transport or storage.
Figure 8:
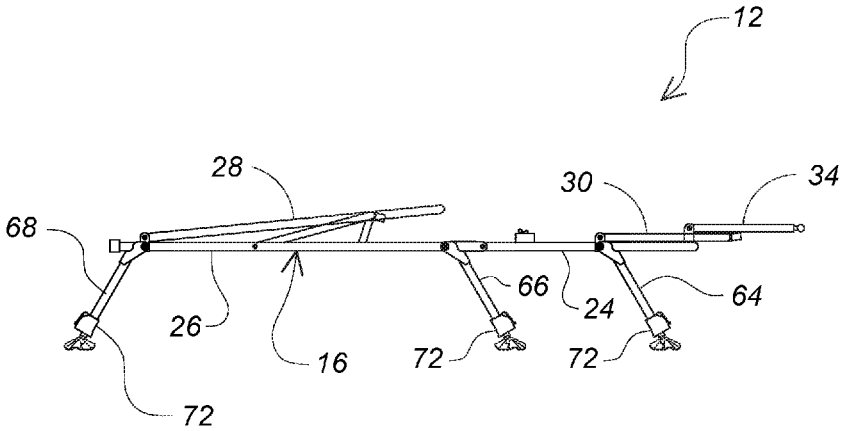
Figure 9:
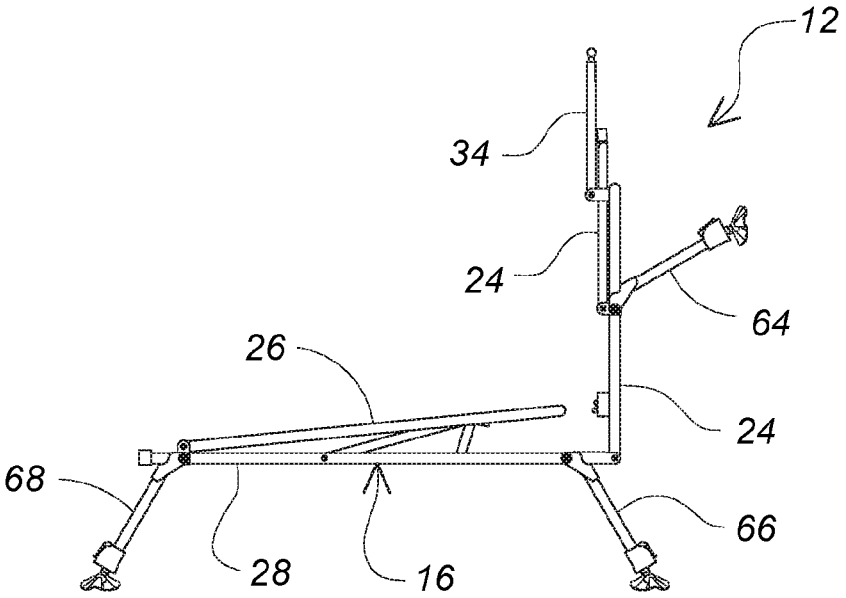
Figure 10:
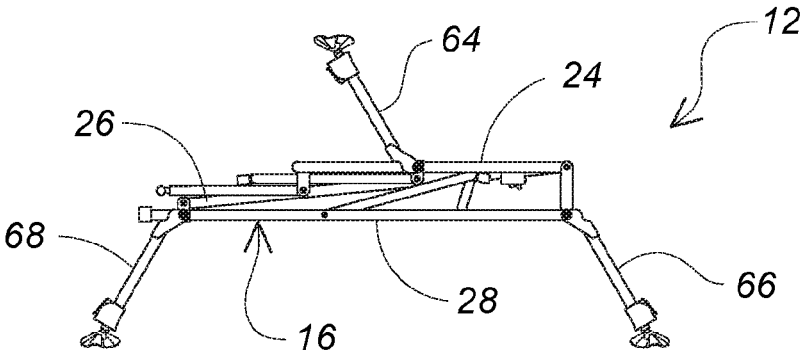
Figure 11:
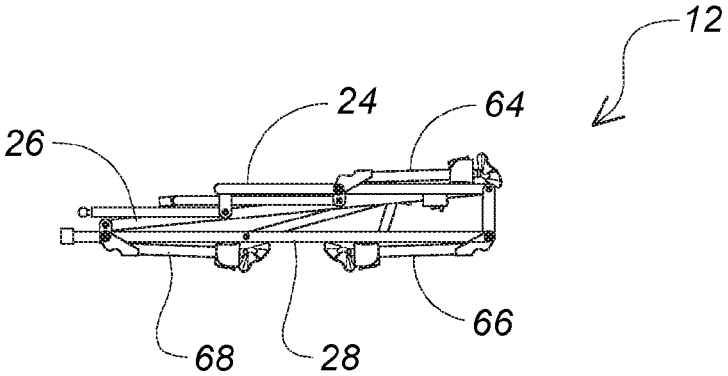

A second function of hinge 62 is that it allows flap frames 54 to be detached from blind 10 and folded as shown in FIG. 6. In this instance as described above, each flap frame 54 is released from bracket 36 on head frame 30 and the opposite end of flap frame 54 is pulled out of pivot bracket 56 which then allows blind 10 to be folded as shown in FIGS. 7-11.

As shown, cot frame 16 is support on three pairs of telescoping legs, namely a first pair 64 is pivoted to head section 24 inboard of head end 32, a second pair 66 is pivoted at the pivot joint between head section 24 and center section 28, and a third pair 68 is pivoted at the pivot joint between center section 28 and foot section 26. A cross brace 70 is provided between each pair of legs to lend strength and rigidity to the assembly. The legs have telescoping sections such that the length of each leg is independently adjustable and may be locked in length with a spring load clamp 72 such that blind 10 may be used in shallow water and can be adjusted to an uneven support surface without being wobbly. A distal end of each of legs may be provided with a lily pad or web foot 74 that settles into the support surface and acts like a suction cup locking pairs of legs in place thus creating stability to make for easy access in and out of the blind.

Support frame 12 may be formed from a tubular material such as steel, aluminum or the like. As shown, frame 12 is formed of sections of round tubing although square tubing could be used. Cot frame 16, U-shaped head frame 30 and U-shaped foot frame 50 preferably have radiused corners so as not to unduly stress cover 14 and support platform 22 but other shapes could be used.

Cover:

Cover 14 is configured to drape over U-shaped head frame 30 and U-shaped foot frame 50 in upright pivoted position. Cover 14 may be formed of a fabric material which may be imprinted with a camouflaging pattern. Spaced apart straps 76 may be provided for attaching vegetation such as reeds, corn stalks or the like to better conceal blind 10.

In the embodiment shown in FIG. 1, cover 14 over head section 24 and center section 28 of cot frame 16 is split to provide access into the interior of blind 10. Cover 14 is attached along its lower edge to support platform 22 and sling 40 is attached to U-shaped head frame 30 at its upper end and to support platform 22 at its lower end. Cover 14 includes attached (or integral) fabric side flaps 78 which are attached to U-shaped flap frames 54 for covering a user positioned in blind 10 generally supine on support platform 22 but with his torso slightly elevated on sling 40. The hunter's feet and gear may fit in the foot box located at a foot end 80 (FIG. 3) of cot frame 16. A padded stop 82 may be provided on U-shaped foot frame 50 to keep U-shaped flap frames 54 from closing too far inward and are held out of contact with the user inside. Windows 84 are provided in flaps 78 such that a user may see out of blind 10 but not be seen by the waterfowl.

In use, blind 10 may be set up as shown in FIG. 1 either in a marshy environment or in a dry filed. As above mentioned, the adjustable legs permit a hunter to position blind 10 in shallow water or in a dry field with a level cot frame 16. With U-shaped flap frames 54 in lowered (FIG. 3), blind 10 substantially conceals the hunter while allowing the hunter to call ducks and observe their flight through windows 84. Once the birds are within shooting range, the hunter may fling open U-shaped flap frame 54 for unobstructed shooting (FIG. 1).

As shown in FIGS. 7-11 support frame 12 may be folded for transport or storage. Straps may be provided on support frame 12 or cover 14 to facilitate carrying the folded blind 10 over one or both shoulders.

In view of the above, it is seen that the objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed is:

1. A layout blind for use in a marshy environment or in a dry field comprising a support frame and a fabric cover, said support frame having an upper and a lower side and a fabric support platform stretched tautly on a cot frame, said cot frame formed in foldable sections;

a U-shaped head frame pivoted to the cot frame; a U-shaped foot frame pivoted to the cot frame;

first and second U-shaped flap support frames pivoted between the head frame and the foot frame, said flap support frames comprising first and second arms connected with a pivot hinge with a stop; and a plurality of extendible legs pivoted to a lower side of the cot frame; and said fabric cover configured to drape over the support frame with the U-shaped head frame and the U-shaped foot frame in upright pivoted position, said fabric cover having a split from the U-shaped head frame to the U-shaped foot frame dividing the fabric cover into fabric flaps into which said U-shaped flap support frames are received, said fabric flaps concealing a reclined user when the U-shaped flap support frames are pivoted on the U-shaped head frame and the U-shaped foot frame over the cot frame.

2. The layout blind of claim 1 wherein the foldable sections of the cot frame comprise a U-shaped head section, a center section and a U-shaped foot section, said U-shaped head section and said U-shaped foot section pivoted to the center section.

3. The layout blind of claim 1 wherein the extendible legs are provided with lily pad or web feet configured to settle into a support surface and act like a suction cup locking the extendible legs in place.

4. A layout blind for use in a marshy environment or in a dry field comprising a support frame and a fabric cover, said support frame having an upper and a lower side and a fabric support platform stretched tautly on a cot frame, said cot frame formed in foldable sections;

a U-shaped head frame pivoted to the cot frame; a U-shaped foot frame pivoted to the cot frame;

first and second U-shaped flap support frames, said flap support frames comprising first and second arms connected with a pivot hinge with a stop, each of said first and second U-shaped flap support frames pivoted at a first end with a pin-release bracket to the U-shaped head frame, each of said flap support frames pivoted at a second end to the U-shaped foot frame with a bracket in which said second end of the flap support frame is freely journaled;

a plurality of extendible legs pivoted to a lower side of the cot frame; and said fabric cover configured to drape over the support frame with the U-shaped head frame and the U-shaped foot frame in upright pivoted position, said fabric cover having a split from the U-shaped head frame to the U-shaped foot frame dividing the fabric cover into fabric flaps into which said U-shaped flap support frames are received, said fabric flaps concealing a reclined user when the U-shaped flap support frames are pivoted on the U-shaped head frame and the U-shaped foot frame over the cot frame.

5. The layout blind of claim 4 wherein the foldable sections of the cot frame comprise a U-shaped head section, a center section with first and second opposing ends and a U-shaped foot section, said U-shaped head section pivoted to the first end of the center section and said U-shaped foot section pivoted to the second end of the center section.

6. The layout blind of claim 5 wherein the center section of the cot frame is tapered such that when the U-shaped foot section is folded against the center section, the U-shaped foot section nests inside the center section.

7. The layout blind of claim 5 wherein the U-shaped head section of the cot frame has a dropped middle on which a sling is attached.

8. The layout blind of claim 4 wherein the extendible legs are provided with lily pad or web feet configured to settle into a support surface and act like a suction cup locking the extendible legs in place.

*9. A layout blind for use in a marshy environment or in a dry field comprising a support frame and a fabric cover,*

*said support frame including a substantially rectangular frame with an upper and a lower side and a fabric support platform stretched tautly on the substantially rectangular frame;*

*a U-shaped head frame pivoted to the substantially rectangular frame, the U-shaped head frame being selectively collapsible against the substantially rectangular frame;*

*a foot frame pivoted to the substantially rectangular frame;*

*first and second U-shaped flap support frames pivoted between the head frame and the foot frame; and*

*a plurality of extendible legs pivoted to the lower side of the support frame; and*

*said fabric cover configured to drape over the support frame with the U-shaped head frame and the foot frame in upright pivoted position, said fabric cover having a split from the U-shaped head frame to the foot frame dividing the fabric cover into fabric flaps into which said U-shaped flap support frames are received, said fabric flaps substantially concealing a reclined user when the U-shaped flap support frames are pivoted on the U-shaped head frame and the foot frame over the support frame.*

*10. The layout blind of claim 9 wherein the support frame includes a U-shaped head section.*

*11. The layout blind of claims 10 wherein the support frame includes a U-shaped foot section and a center section extending to and between the U-shaped head section and the U-shaped foot section.*

*12. The layout blind of claim 10 wherein the foot frame is pivoted to the substantially rectangular frame inboard of an end of the substantially rectangular frame that is opposite to the U-shaped head section and the U-shaped head frame is pivoted to the substantially rectangular frame inboard of an end of U-shaped head section.*

*13. The layout blind of claim 12 wherein, when the layout blind is in use, the U-shaped head section is coplanar with a center section of the support frame.*

*14. The layout blind of claim 9 wherein the U-shaped head frame has a dropped middle on which a sling is attached.*

*15. A layout blind for use in a marshy environment or in a dry field comprising a support frame and a fabric cover,*

*said support frame having an upper and a lower side and a fabric support platform stretched tautly on the support frame;*

*a U-shaped head frame pivoted to the support frame;*

*a foot frame pivoted to the support frame;*

*first and second U-shaped flap support frames pivoted between the head frame and the foot frame; and*

*a plurality of extendible legs pivoted to the lower side of the support frame; and*

*said fabric cover configured to drape over the support frame with the U-shaped head frame and the foot frame in an upright pivoted position, said fabric cover having*

*a split from the U-shaped head frame to the foot frame dividing the fabric cover into fabric flaps into which said U-shaped flap support frames are received, said fabric flaps substantially concealing a reclined user when the U-shaped flap support frames are pivoted on the U-shaped head frame and the foot frame over the support frame,*

*wherein the flap support frames include first and second arms connected with a pivot hinge with a stop.*

*16. A layout blind for use in a marshy environment or in a dry field comprising a support frame and a fabric cover,*

*said support frame including a substantially rectangular frame with an upper and a lower side and a fabric support platform stretched tautly on the substantially rectangular frame;*

*a U-shaped head frame pivoted to the substantially rectangular frame, the U-shaped head frame being selectively collapsible against the substantially rectangular frame:*

*a foot frame pivoted to the support frame;*

*first and second U-shaped flap support frames, each of said first and second U-shaped flap support frames pivoted at a first end with a pin-release bracket to the U-shaped head frame, each of said flap support frames pivoted at a second end to the foot frame;*

*a plurality of extendible legs pivoted to the lower side of the support frame; and*

*said fabric cover configured to drape over the support frame with the U-shaped head frame and the foot frame in upright pivoted position, said fabric cover having a split from the U-shaped head frame to the foot frame dividing the fabric cover into fabric flaps into which said U-shaped flap support frames are received, said fabric flaps substantially concealing a reclined user when the U-shaped flap support frames are pivoted on the U-shaped head frame and the foot frame over the support frame.*

*17. The layout blind of claim 16 wherein said second end of each flap support frame is freely journaled.*

*18. The layout blind of claim 16 wherein the support frame includes a U-shaped head section.*

*19. The layout blind of claim 18 wherein the support frame includes a U-shaped foot section and a center section extending to and between the U-shaped head section and the U-shaped foot section.*

*20. The layout blind of claim 16 wherein the U-shaped head frame has a dropped middle on which a sling is attached.*

*21. The layout blind of claim 16 wherein the U-shaped head frame is pivoted to the support frame inboard of a head end of the support frame and the foot frame is pivoted to the support frame inboard of an end of the support frame that is opposite to the head end.*

*22. A layout blind for use in a marshy environment or in a dry field comprising a support frame and a fabric cover,*

*said support frame having an upper and a lower side and a fabric support platform stretched tautly on the support frame;*

*a U-shaped head frame pivoted to the support frame;*

*a foot frame pivoted to the support frame;*

*first and second U-shaped flap support frames, each of said first and second U-shaped flap support frames pivoted at a first end with a pin-release bracket to the U-shaped head frame, each of said flap support frames pivoted at a second end to the foot frame;*

*a plurality of extendible legs pivoted to the lower side of the support frame; and*

*said fabric cover configured to drape over the support frame with the U-shaped head frame and the foot frame in upright pivoted position, said fabric cover having a split from the U-shaped head frame to the foot frame dividing the fabric cover into fabric flaps into which said U-shaped flap support frames are received, said fabric flaps substantially concealing a reclined user when the U-shaped flap support frames are pivoted on the U-shaped head frame and the foot frame over the support frame,*

*wherein the flap support frames include first and second arms connected with a pivot hinge with a stop.*

*23. A blind for use in a marshy environment or in a dry field comprising:*

*a support frame including a U-shaped head section with a head end, an end section opposite the head end and a center section including opposing elongate tubes extending to and between the U-shaped head section and the end section;*

*a fabric cover;*

*a fabric support platform stretched tautly on the support frame;*

*a U-shaped first frame pivoted to the support frame adjacent to, spaced-apart from and inboard of the head end, the U-shaped first frame being selectively collapsible against the U-shaped head section of the support frame;*

*a second frame pivoted to the support frame at two opposing locations on the support frame adjacent to, spaced-apart from and inboard of the end section;*

*first and second U-shaped flap support frames pivoted between the first frame and the second frame; and*

*a plurality of extendible legs pivoted to a lower side of the support frame;*

*wherein the fabric cover is configured to drape over the support frame with the first frame and the second frame in an upright pivoted position, the fabric cover having a split from the first frame to the second frame dividing the fabric cover into fabric flaps into which the U-shaped flap support frames are received, the fabric flaps substantially concealing a reclined user when the U-shaped flap support frames are pivoted on the first frame and the second frame over the support frame.*

*24. The blind of claim 23 wherein the second frame is pivoted to the center section of the support frame.*

*25. The blind of claim 24 wherein the support frame includes a foot section, the center section extending to and between the U-shaped head section and the foot section.*

*26. The blind of claim 23 wherein the second frame is U-shaped.*

*27. The blind of claim 23 wherein the first frame has a dropped middle on which a sling is attached.*

* * * * *